United States Patent Office 3,442,882
Patented May 6, 1969

3,442,882
PROCESS OF PREPARING COPOLYMERS FROM HALOMETHYLATED AROMATIC HYDROCARBONS AND CONJUGATED DIOLEFINS WITH FRIEDEL-CRAFTS CATALYST
Roger L. Weichman and William L. Fierce, Crystal Lake, Ill., assignors, by mesne assignments, to Union Oil Company of California, Los Angeles, Calif., a corporation of California
No Drawing. Continuation of application Ser. No. 327,058, Nov. 29, 1963. This application May 9, 1968, Ser. No. 728,086
Int. Cl. C08f *3/16, 15/06*
U.S. Cl. 260—94.2          13 Claims This application is a continuation of Ser. No. 327,058, now abandoned.

This invention relates to new compositions of matter and to the method of preparing same. The new compositions are copolymers of aromatic hydrocarbons containing one or more halomethyl groups, e.g., benzyl halides or xylylene dihalides and aliphatic or alicyclic organic compounds having conjugated double bond carbon linkages.

In accordance with this invention the discovery has been made that when an aromatic hydrocarbon containing one or more halomethyl groups, such as benzyl halide or a xylylene dihalide, and a substituted or unsubstituted organic compound containing conjugated double bond carbon linkages are contacted in the presence of a Friedel-Crafts catalyst such as zinc chloride a copolymerization is effected. The reaction can be carried out at moderate temperatures (from about 50° C. to about 100° C.) at atmospheric pressures, or at 0° to 25° C. when superatmospheric pressures are applied, in the presence or absence of an unreactive solvent. Using benzyl chloride and 1,3-butadiene, the copolymerization produces both liquid and solid polymers varying in molecular weight from about 505 to 1230 and having chlorine contents ranging from 0 to about 10% by weight.

The products of this invention exhibit properties of plastics and find use in the plastics field as well as use as protective coatings. The products also have uses similar to styrene-butadiene polymers. Accordingly, it becomes a primary object of this invention to provide as a composition of matter copolymers of aromatic hydrocarbons containing one or more halomethyl groups and organic compounds having conjugated double bond carbon linkages.

An object of this invention is to provide copolymers derived from the reaction of mono- and polyhalomethyl benzenes or naphthalenes with aliphatic and alicyclic conjugated polyolefins.

Another object of this invention is to provide copolymers of benzyl halides and butadiene.

Another object of this invention is to provide copolymers of xylylene dihalides and butadiene.

Another object of this invention is to provide copolymers of benzyl chloride and butadiene.

A further object of this invention is to provide a process of preparing copolymers of aromatic hydrocarbons containing one or more halomethyl groups and organic compounds having conjugated double bond carbon linkages, i.e., by polymerization at moderate temperatures in the presence of a Friedel-Crafts catalyst.

These and other objects of this invention will become apparent or be described as the specification proceeds.

In order to demonstrate the invention the following examples are given:

EXAMPLE I

No reaction occurred when 66.4 g. (1.22 moles) of 1,3-butadiene was bubbled through a stirred mixture of 150.0 g. (1.18 moles) of benzyl chloride and 3.0 g. of anhydrous zinc chloride. The reaction was conducted in a 3-necked, 500 ml. flask equipped with mercury-sealed stirrer, water-cooled condenser, thermometer, and bubbler tube. The butadiene was bubbled through the benzyl chloride at a rate of 100 cc./min. for five hours at room temperature (about 28° C.). The reaction mixture was washed four times with water, dried by filtration, and distilled at reduced pressure. Unreacted benzyl chloride was the only product recovered.

EXAMPLE II

No reaction occurred when 1,3-butadiene was bubbled through a mixture of benzyl chloride, zinc chloride, and dimethylformamide solvent at room temperature (about 30° C.). The apparatus and experimental conditions were exactly the same as in Example I, except that 150 ml. of dimethylformamide was added.

EXAMPLE III

A butadiene-benzyl chloride copolymer was obtained when the reaction at atmospheric pressure was conducted at a higher temperature. In this run the conditions of Example I were repeated, only the temperature was 69°–80° C. The product, a very dark brown liquid, was washed twice with 200 ml. portions of a 1:1 mixture of water and methanol and then twice with 100 ml. portions of water. The product was dried by filtration and then vacuum distilled. After removal of the unreacted benzyl chloride the product was heated strongly under vacuum for about 12 hours in an attempt to distill the residue. A maximum temperature of 246° C. at 0.120 mm. of mercury was attained. The major product was about 35 g. of a clear brittle, light brown solid residue with a molecular weight of 1230 and a chlorine content of <0.1 wt. percent. The infrared spectrum of this material showed it to contain a large amount of aromatic ring structure similar to styrene-butadiene polymers. The amount of C=C (aliphatic) bonds in this material was much less than in the products of Example V, indicating a greater degree of cross-linking.

EXAMPLE IV

A butadiene polymer was obtained when benzyl chloride and excess liquid butadiene were contacted at room temperature and autogenous pressure in a sealed reactor. A 200 ml. stainless steel reactor was charged with 100.2 g. (0.792 mole) of benzyl chloride, 46.5 g. (0.860 mole) of 1,3-butadiene, and 3.5 g. of anhydrous zinc chloride. The pressure gradually dropped from 58 p.s.i.g. to 0 p.s.i.g. over the course of 6–7 days. The reactor was opened after 16 days and found to contain a heavy brown liquid and a brown sludge-like material. Vacuum distillation of the liquid yielded 60.7 g. of a brittle, brown, solid residue. The maximum temperature attained was 174° C. at about 3 mm. of mercury. The solid was predominantly an aliphatic hydrocarbon containing C=C (aliphatic) bonds and little or no aromatic rings. The chlorine content was 0.7 wt. percent and the molecular weight was 950.

EXAMPLE V

A butadiene-benzyl chloride copolymer was obtained when excess benzyl chloride and liquid butadiene were contacted at room temperature and autogenous pressure in a sealed reactor. A 200 ml. stainless steel reactor was charged with 100.2 g. (0.792 mole) of benzyl chloride, 39.4 g. (0.728 mole) of 1,3-butadiene, and 0.9 g. of anhydrous zinc chloride. The reactor was allowed to stand at room temperature for 11 days. During this time the pressure gradually dropped from 65 p.s.i.g. to 10 p.s.i.g. The product consisted of a brown liquid and some white solid (ZnCl$_2$). None of the sludge-like material noted in Example IV formed. After removal of the unreacted benzyl chloride by vacuum distillation, an 8.3 g. sample of the thick, brown, viscous liquid residue was removed for analysis. The remaining residue was then heated under vacuum to a temperature of 182° C. at 4.3 mm. of mercury. The result was 31.2 g. of a brittle, reddish brown, solid residue. The liquid and solid residues were found to have molecular weights of 505 and 1210 and chlorine contents of 9.9 and 3.9 wt. percent, respectively. The infrared spectra of the products showed them to be similar to each other and to contain a large amount of aromatic ring structure similar to styrene-butadiene polymers. The solid contained less C=C (aliphatic) bonds than the liquid, indicating that the heating produced cross-linking.

From the foregoing examples it is apparent that no reaction occurs at room temperature and atmospheric pressure in the presence or absence of a solvent (Examples I and II). From Example III it is seen that the reaction can be carried out at atmospheric pressure at moderate temperatures (above about 50° C.) by bubbling butadiene gas through liquid benzyl chloride.

The polymers are also obtained at lower temperatures (25° C. or lower) when liquid butadiene and benzyl chloride are contacted in a sealed reactor at superatmospheric pressure. Example IV demonstrates that when the butadiene is present in excess, the only product is a butadiene polymer. From Example V, if the benzyl chloride is present in excess, a benzyl chloride-butadiene copolymer results.

The properties of the polymers can be varied by heating. When the liquid polymer described in Example V (molecular weight 505, wt. percent chloride 9.9) was heated, it became a higher molecular weight solid with a lower chlorine content and less C=C (aliphatic) bonds (molecular weight 1210, wt. percent chlorine 3.9). The decrease in C=C (aliphatic) bonds indicates a greater degree of cross-linking. Extended heating of the polymer of Example III produced a solid which had considerably less C=C (aliphatic) bonds than the above polymers, and which had a chlorine content of essentially zero (molecular weight 1230, wt. percent chlorine <0.1).

The starting material for the process of this invention may comprise any monohalomethyl- or polyhalomethyl-aromatic compound wherein the activity of the halomethyl group is not impaired by interfering substituents. These starting materials are readily prepared by the well known halomethylation reaction, the classic example of which is illustrated by the work of Grassi and Maselli in 1898 (Gazz. chim. ital., 28, II, 477) using benzene, hydrogen chloride, paraformaldehyde and zinc chloride. The nuclear halomethylation, particularly the chloromethylation and bromomethylation of a large group of aromatic compounds, has been practiced for a long period of time and any of the products so produced may be used in the reaction of this invention.

The halomethylation reaction used to prepare the starting materials for this invention, with chloromethylation as illustrative, is applicable to aromatic compounds in general to include benzene, naphthalene, anthracene, phenanthrene, biphenyl and many of their derivatives. Terphenyl is noted for its resistance to chloromethylation. Monoalkyl benzene derivatives having side chains of 1 to 10 carbon atoms yield para chloromethyl compounds most frequently, with lesser amounts of ortho isomers. A second chloromethyl group is easily introduced and excellent yields of dichloromethyl aromatic compounds are readily obtained. Examples are dichloromethyl derivatives of m-xylene and mesitylene.

Certain groups on the ring of the aromatic compound interfere with the halomethylation reaction and cause the chloromethylation reaction to be more difficult to effect. An example is a halogen atom on the ring. Such compounds as bromo- and chlorobenzene, bromo- and chlorotoluenes and p-dichlorobenzene can, however, be chloromethylated, though the yields are low, and some are included within the scope of the starting materials for this invention. More highly halogenated aromatic derivatives generally fail to undergo chloromethylation. However, high yields of chloromethylated products are obtained from halogen derivatives of polymethyl benzenes. The presence of a nitro group tends to inhibit the reaction but chloromethylated derivatives of nitrobenzene, o-nitrotoluene, p-nitrotoluene, nitromesitylene, and 1-nitronaphthalene have been prepared.

Aromatic ketones, though generally unreactive, are not excluded as starting materials, because chloromethylation has been practiced with such ketones as acetomesitylene, acetoisodurene and 2,4,6-triethylacetophenone. Phenols, as is known, yield polymers, but nitrophenols of aromatic character may be chloromethylated. Esterification of the phenols by treatment with ethyl chlorocarbonate to yield ethyl aryl carbonates avoids this difficulty. Similarly aromatic amines form condensation products and simple chloromethyl derivatives are difficult to isolate from the products. As is well known in this art, certain substituents on the aromatic ring tend to hasten chloromethylation, i.e., the reaction is aided by the presence of methyl, ethyl, propyl, methoxy and propoxy groups. The presence of chloro, bromo, iodo, chloromethyl, carboxyl and nitro groups diminishes the rate of the reaction but the products are within the scope of this invention.

Among the aromatic compounds that may be used as starting materials for the reaction of this invention are 2-chloromethyl-1,3,5-triisopropylbenzene, 2-chloromethyl-p-xylene, 3,6-dichloromethyl-p-xylene, 2,3-dichloromethyl-p-xylene, p-chloromethyltoluene, ortho-chloromethyltoluene, 2,4 - dichloromethyltoluene, 4 - chloromethyl-o-xylene, 3-chloromethyl-o-xylene, 4,5 - dichloromethyl-o-xylene, 4-chloromethyl-m-xylene, 4,6-dichloromethyl-m-xylene, 2,4-dichloromethyl-m-xylene, 3-chloromethyl-p-xylene, p - chloromethylethylbenzene, p - chloromethylpropylbenzene, p-chloromethylcumene, and the like.

Other aromatic compounds that may be used to prepare halomethylated aromatics to be used in accordance with this invention are isobutyl-p-cymene, n-butylbenzene, t-amylbenzene, p-t-butylethylbenzene, p - t - butyltoluene, mesitylene, durene, isodurene, prehnitene, 1,3-dimethyl-5-t-butylbenzene, biphenyl, cyclohexylbenzene, 1,3,5-triisopropylbenzene, 1,3,5-triethylbenzene, bibenzyl, hydrindene, naphthalene, α-methylnaphthalene, β - methylnaphthalene, isononylnaphthalene, diisopropylnaphthalene, isododecylnaphthalene, n-dodecylnaphthalene, tetralin, acenaphthene, anthracene, phenanthrene, 1,2-benzanthracene, chlorobenzene, p-dichlorobenzene, p-chlorotoluene, p-bromotoluene, benzyl chloride, benzyl bromide, bromobenzene, chloromesitylene, bromomesitylene, bromodurene, nitrobenzene, anisole, methyl-o-cresyl ether, methyl-m-cresyl ether, n-butyl phenyl ether, hydroquinone dimethyl ether, and the like, all of which have been successfully chloromethylated to place at least one chloromethyl group on the ring. Bromomethylated and iodomethylated derivatives of the foregoing are also included although not preferred because of expense and reduced activity. The halomethylated aromatic starting material has a minimum of 6 carbon atoms and a maximum of about 14 carbon atoms in the aromatic portion. The alkyl substituents attached to the ring or rings of the aromatic may contain 1 to 20 carbon atoms, and may be of straight-chain, branched-chain or cyclic configuration, i.e., $C_3$ to $C_7$ cycloalkyl. Preferably only one such substituent is present on any one aromatic ring.

Accordingly the halomethyl starting materials for the reactions of this invention include those compounds of the formula

wherein A is any aromatic compound or derivative of an aromatic compound, as illustrated by the foregoing species, containing or not containing a substituent which does not interfere with the halomethylation reaction, X is a halogen, preferably Cl, Br or I and $n$ represents the number of halomethyl groups attached to one or more of the rings of said aromatic compound. A preferred group of halomethylated compounds to be used as starting materials for this invention is made up of those compounds of the above formula in which A is an aryl radical having 6, 10 or 14 cyclic carbon atoms, as illustrated by phenyl, tolyl, xylyl, naphthyl and anthryl radicals and $n$ represents the number of halomethyl groups attached to cyclic carbon atoms in the aryl radical, $n$ being an integer of 1 to 6 where A is a single aromatic ring, an integer of 1 to 8 when A is a fused ring such as naphthyl, and an integer of 1 to 10 when A is a fused ring such as anthryl and X is chlorine or bromine. Examples of non-interfering substituents that may be attached to one or more cyclic carbon atoms are $C_1$ to $C_{20}$ alkyl, $C_3$ to $C_7$ cycloalkyl, $C_1$ to $C_{10}$ alkoxy, halogen, nitro, keto, and hydroxyl.

A preferred group of species thereunder is constituted by chloromethylbenzene
bromomethylbenzene
o-xylylene dichloride
o-xylyl chloride
o-xylylene dibromide
o-xylyl bromide
p-xylylene dichloride
p-xylylene dibromide
m-xylylene dichloride
m-xylylene dibromide
α-chloromethylnaphthalene
β-chloromethylnaphthalene
α,β-dichloromethylnaphthalene
α,β-dibromomethylnaphthalene
1,2,3-trichloromethylnaphthalene The olefinic reactant for this invention can be any organic polyolefin of aliphatic or alicyclic configuration wherein the double bonds are conjugated. These may have aromatic rings substituted with unreactive groups which do not interfere with the reaction. Species of compounds to illustrate the invention include:

Aliphatic di- and polyolefinic hydrocarbons 1,3-butadiene
1,3-pentadiene
2-methyl-1,3-butadiene (isoprene)
2,4-hexadiene
1,3,5-hextriene
2-chloro-1,3-butadiene (chloroprene)
2-methyl-1,3-pentadiene
3-methyl-1,3-pentadiene
4-methyl-1,3-pentadiene
2-ethyl-1,3-butadiene
2,3-dimethyl-1,3-butadiene
4-methyl-1,3-hexadiene
2-methyl-2,4-hexadiene
2,4-dimethyl-1,3-pentadiene
2-isopropyl-1,3-butadiene
1,1,3-trimethyl-1,3-butadiene
2,4-octadiene
2,4,6-octatriene
2,5,5-trimethyl-1,3-hexadiene
2-n-amyl-1,3-butadiene
1,1-dimethyl-3-t-butyl-1,3-butadiene Alicyclic di- and polyolefinic hydrocarbons 1,3-cyclopentadiene
1,3-cyclohexadiene
1,3-cycloheptadiene
1,3,5-cycloheptatriene
1-vinyl-1-cyclopentene
1-vinyl-1-cyclohexene Aromatic-substituted polyolefins trans-1-phenyl-1,3-butadiene
2-phenyl-1,3-butadiene
1,4-diphenyl-1,3-butadiene
2,3-diphenyl-1,3-butadiene Other Friedel-Crafts type catalysts can be used in the process of this invention. Examples are $FeCl_3$, $BF_3$, HF, $AlCl_3$, $SbCl_5$, and $SnCl_4$. In carrying out the method, any desired proportions of the mono- or polyhalomethyl aromatic compound and conjugated olefin can be mixed together to obtain the desired polymer provided the temperature is at least about 50° C. and no more than about 250° C. at atmospheric pressures. The temperature can be reduced to within about 0° to 25° C. if superatmospheric pressures, not exceeding about 200 p.s.i.g., are used. A minimum of about 2 hours to a maximum of about 10 days may be required to complete the reaction depending on the conditions and proportions of ingredients. A highly desirable copolymer is obtained using equimolar proportions of reactants. In general, the reactant molar ratios can vary from about 0.1/1.0 to 1.0/0.1 at atmospheric pressures. A stoichiometric excess of the polyhalomethyl aromatic is required to effect copolymerization at 25° C. and below, under superatmospheric pressures.

Preferred species of this invention comprise the products obtained by reacting benzyl chloride and 1,3-butadiene or xylylene dichloride and 1,3-butadiene in substantially molar ratios at a temperature sufficient to form a copolymer product. The halogen content of the end product is not significant, being a function of the molar ratios and completeness of the reaction. Copolymers containing no halogen can be produced and are contemplated by this invention. The molecular weight of the end product is also subject to variation and can be from about 500 to 3000 or more.

The copolymer products are useful as structural plastics. With the use of plasticizers, the products can be used to form coatings and find use as ingredients in coating compositions, paint, emulsions, asphalts, concrete curing compositions, compositions to protect metal surfaces from corrosion and the like.

A preferred group of organic compounds having conjugated double bond linkages comprises 1,3-butadiene, 1,3-pentadiene, 2,4-hexadiene, 2-ethyl-1,3-butadiene, 2-chloro-1,3-butadiene, 2,4-octadiene and trans-1-phenyl-1,3-butadiene.

We claim:

1. A process for preparing a copolymer which comprises reacting a halomethylated aromatic hydrocarbon and a conjugated diolefin hydrocarbon in the presence of a Friedel Crafts catalyst at a temperature of about 0° to 250° C., and a pressure of about 0 to 200 p.s.i.g., employing a molal excess of said halomethylated aromatic hydrocarbon and higher pressures within said range when the temperature is low, and temperatures above about 50° C. when the pressure is atmospheric.

2. The process of claim 1 in which benzyl chloride is reacted with 1,3-butadiene in the presence of $ZnCl_2$.

3. The process of claim 1 in which the conjugated diolefin is an aliphatic hydrocarbon having not more than about 10 carbon atoms.

4. A process according to claim 3 in which the halomethylated aromatic hydrocarbon is a halomethylated benzene.

5. The process of claim 4 in which the halomethylated aromatic hydrocarbon is ortho-xylene dihalide.

6. The process of claim 4 in which the halomethylated aromatic hydrocarbon is meta-xylylene dihalide.

7. The process of claim 4 in which the halomethylated aromatic hydrocarbon is para-xylylene dihalide.

8. A copolymer prepared by reacting a halomethylated aromatic hydrocarbon and a conjugated diolefin hydrocarbon in the presence of a Friedel Crafts catalyst at a temperature of about 0° to 250° C., and a pressure of about 0 to 200 p.s.i.g., employing a molal excess of said halomethylated aromatic hydrocarbon and higher pressures within said range when the temperature is low, and temperatures above about 50° C. when the pressure is atmospheric.

9. A copolymer according to claim 8 prepared by reacting a benzyl halide and an aliphatic conjugated diolefin.

10. The copolymer of claim 9 in which the benzyl halide is benzyl chloride.

11. A copolymer according to claim 8 prepared by reacting a xylylene dihalide and an aliphatic conjugated diolefin.

12. A copolymer according to claim 8 obtained by reacting 1,3-butadiene and benzyl chloride at substantially atmospheric pressure in the presence of zinc chloride at a temperature of about 50° to 100° C.

13. A copolymer according to claim 8 obtained by reacting 1,3-butadiene in the liquid phase with a molal excess of benzyl chloride.

References Cited

UNITED STATES PATENTS

| | | |
|---|---|---|
| 2,377,433 | 6/1945 | Lieber. |
| 2,603,655 | 7/1952 | Strain. |
| 3,104,267 | 9/1963 | Antonsen et al. |
| 3,244,758 | 4/1966 | Eberhardt. |

JOSEPH L. SCHOFER, *Primary Examiner.*

WILLIAM HAMROCK, *Assistant Examiner.*

U.S. Cl. X.R.

260—87.5, 671